March 30, 1926.   1,578,310
L. H. CAMPBELL, JR., ET AL
VEHICLE OF THE TYPE KNOWN AS A TANK
Filed Dec. 8, 1925
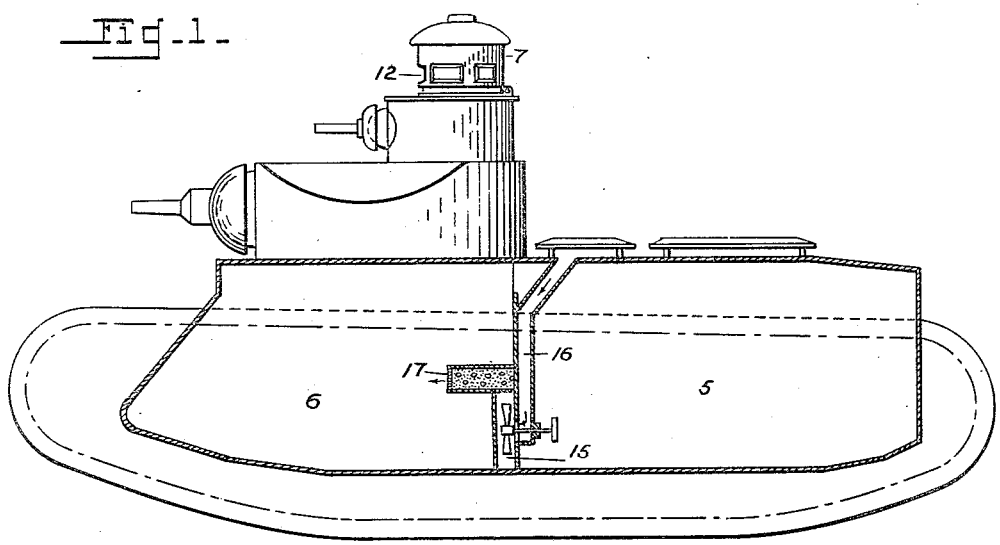
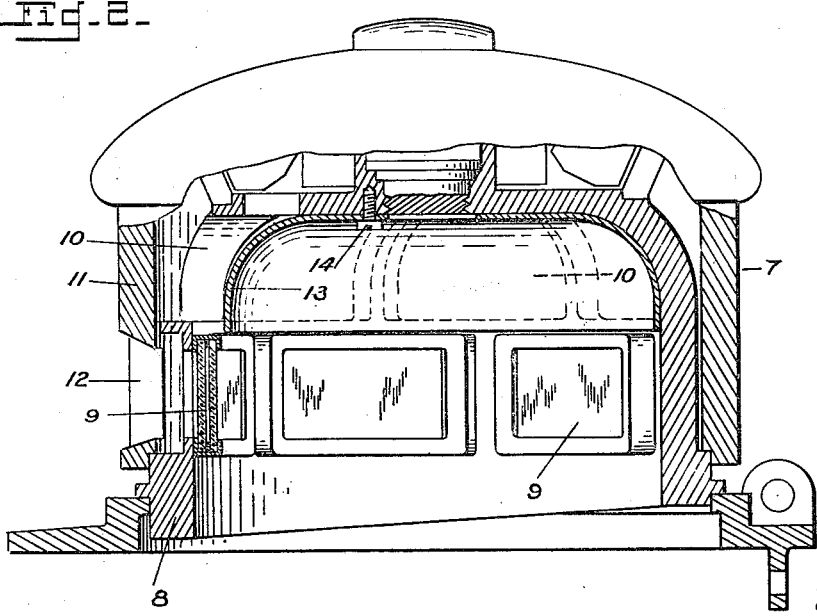
Inventor
Levin H. Campbell Jr.
Emil F. Norelius
By W. N. Roach
Attorney Patented Mar. 30, 1926.

UNITED STATES PATENT OFFICE.

1,578,310

LEVIN H. CAMPBELL, JR., OF THE UNITED STATES ARMY, AND EMIL F. NORELIUS, OF DAVENPORT, IOWA.

VEHICLE OF THE TYPE KNOWN AS A TANK.

Application filed December 8, 1925. Serial No. 74,146.

(GRANTED UNDER THE ACT OF MARCH 3, 1883; 22 STAT. L. 625.)

*To all whom it may concern:*

Be it known that we, LEVIN H. CAMPBELL, Jr., major, United States Army, and EMIL F. NORELIUS, citizens of the United States, and residents of Rock Island Arsenal, in the county of Rock Island and State of Illinois, and Davenport, in the county of Scott and State of Iowa, respectively, have invented an Improvement in Vehicles of the Type Known as Tanks, of which the following is a specification.

The invention described herein may be used by the Government, or any of its officers or employees in prosecution of work for the Government, or by any other person in the United States without payment to us of any royalty thereon, in accordance with the act of March 3, 1883.

This invention relates to a vehicle of the type known as a tank.

In armored tanks provided with a conning tower of the stroboscope type the method of ordinarily ventilating the fighting compartment consists in providing large apertures in the roof of the tower through which the air is expelled on rotation of the shield of the tower.

When the tank is being operated in gas infested areas or when the guns are kept in sustained action it is desirable to employ a ventilating system which consists in establishing and maintaining a pressure within the compartment sufficiently greater than atmospheric pressure to positively insure an outward flow of the air through any small orifices or cracks in the tank body and by this means to exclude all noxious gases from the compartment. It will be impossible to maintain the pressure within the compartment if large apertures in the tower remain open and it is the object of this invention to provide means for readily sealing these apertures.

To these and other ends, our invention consists in the construction, arrangement, and combination of elements, described hereinafter and pointed out in the claims forming a part of this specification.

A practical embodiment of the invention is illustrated in the accompanying drawings, wherein:

Fig. 1 is a fragmentary longitudinal sectional view of a tank equipped with a pressure ventilating system; and Fig. 2 is a fragmentary vertical sectional view through the conning tower showing means for closing the ordinary ventilating apertures when the pressure ventilating system is to be operated.

Referring to the drawings by numerals of reference:

The tank is divided in the usual manner into two compartments, the rear compartment 5 housing the engine, and the forward or fighting compartment 6 in which are stationed the personnel for manning the guns and operating the engine.

On the roof of the fighting compartment is a conning tower 7 of the stroboscope type comprising a stationary shell 8 having windows 9 and ventilating apertures 10 and on the shell is mounted for rotation a shield 11 having small apertures 12 positioned opposite the windows 9. Under ordinary circumstances the air from the compartment passes out through the apertures 10 aided by rotation of the shield but when it is desired to maintain a slight pressure within the compartment, as will presently be described, it becomes necessary to close these apertures. This may be conveniently accomplished by providing a dished cover 13 which may be quickly secured in place from within the compartment by means of screw bolts 14 entering the roof of the shell 8.

The manner of creating a pressure within the compartment to exclude noxious gases consists in providing a fan or blower 15 driven independently, or by connection with the engine, as indicated. The fan draws air in through an intake passage 16 leading from the roof of the tank and delivers it through a chemical purifier 17 to the compartment 6 under a pressure slightly in excess of atmospheric pressure. As the air in the compartment is thus expelled through the small orifices in the tank body it will effectively exclude the surrounding gases.

While in the foregoing there has been illustrated and described such combination and arrangement of elements, as constitute the preferred embodiment of our invention, it is nevertheless desired to emphasize the fact that interpretation of the invention should only be conclusive when made in the light of the subjoined claims.

We claim:

1. In a tank, a conning tower having apertures for normally ventilating the tank, an apparatus adapted to deliver chemically purified air to the tank under pressure, and a dished cover adapted to be readily secured to the conning tower to close its apertures, when said apparatus is to be operated.

2. In a tank, a conning tower having apertures for normally ventilating the tank, an apparatus adapted to deliver chemically purified air to the tank under pressure, and means adapted to be readily secured to the conning tower to close its apertures when said apparatus is to be operated.

LEVIN H. CAMPBELL, Jr.
EMIL F. NORELIUS.